June 18, 1957 G. GORHAM ET AL 2,795,998
MICROTOMES
Filed May 6, 1952 7 Sheets-Sheet 2
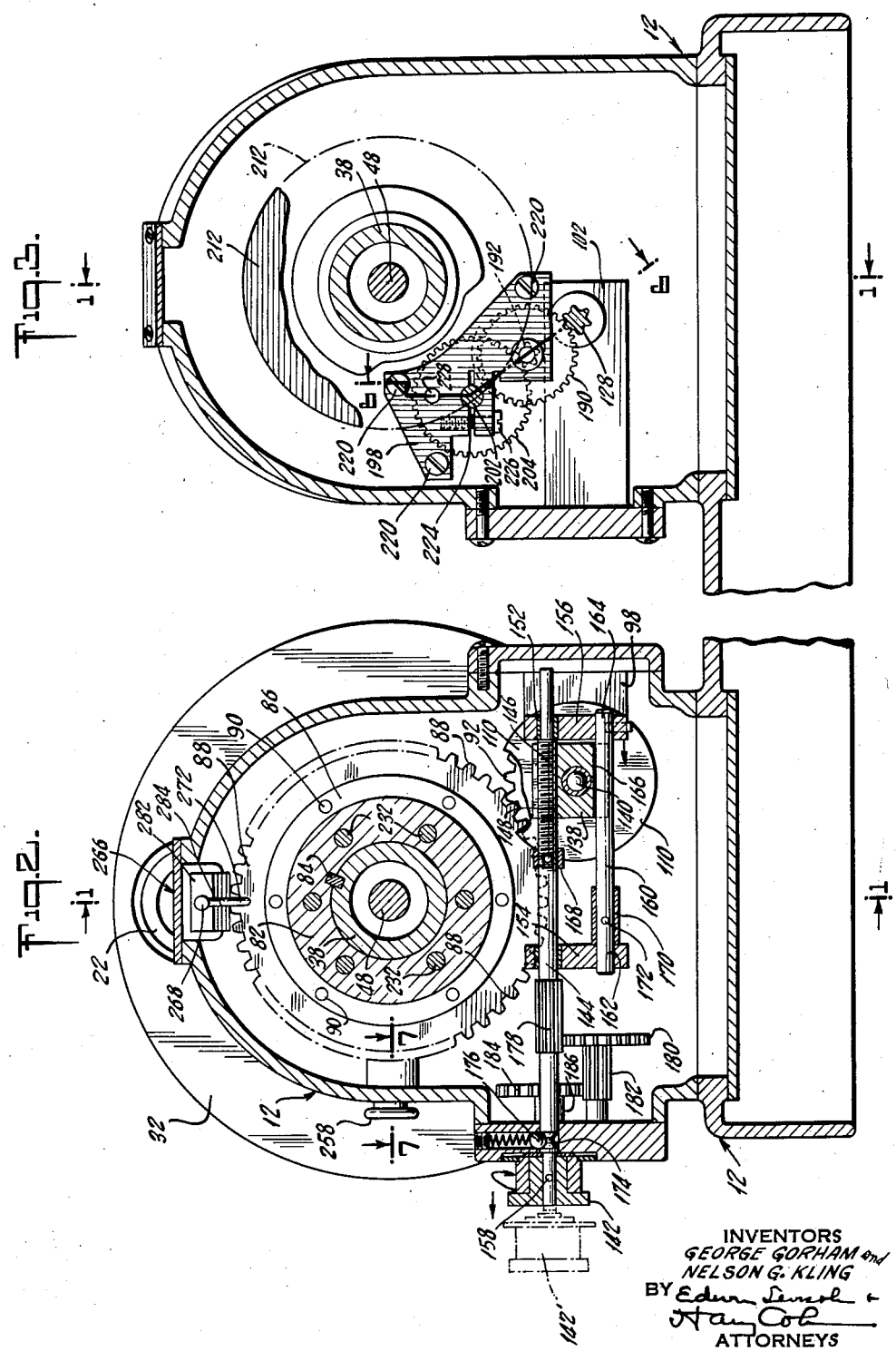
INVENTORS
GEORGE GORHAM and
NELSON G. KLING
BY
ATTORNEYS June 18, 1957 G. GORHAM ET AL 2,795,998
MICROTOMES
Filed May 6, 1952 7 Sheets-Sheet 3
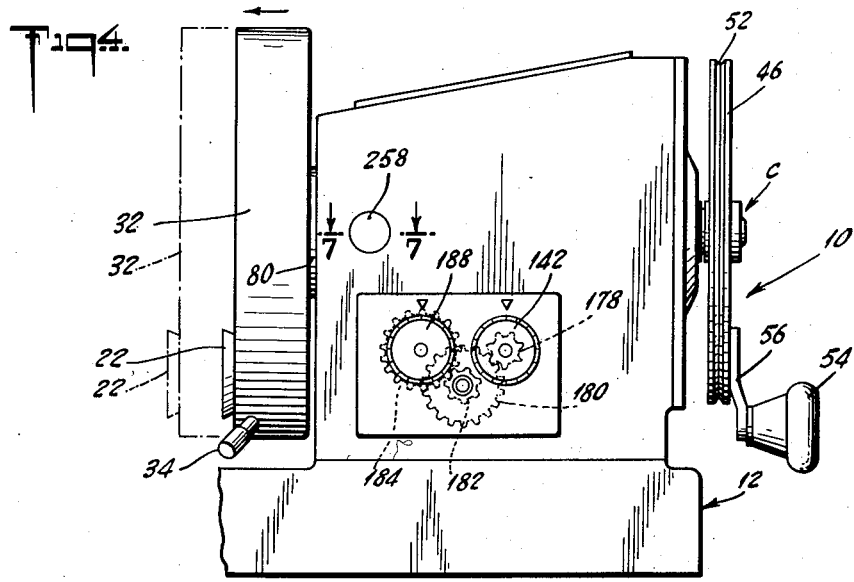
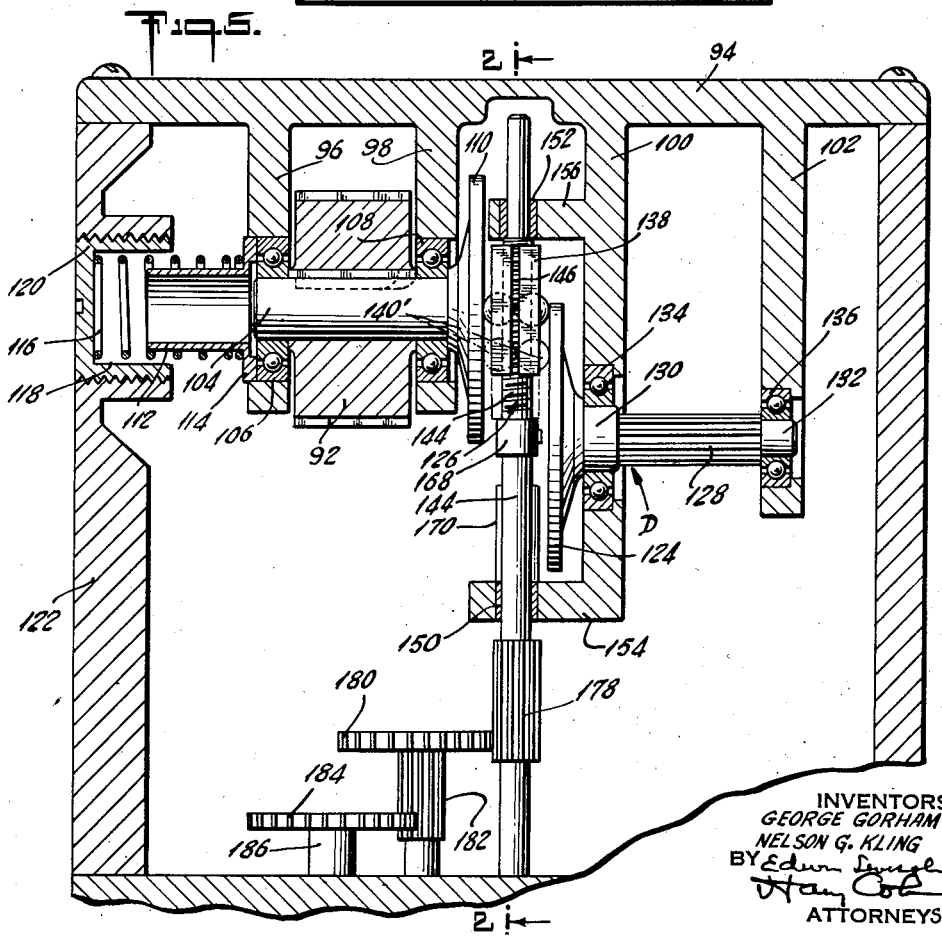
INVENTORS
GEORGE GORHAM AND
NELSON G. KLING
BY
ATTORNEYS June 18, 1957  G. GORHAM ET AL  2,795,998
MICROTOMES Filed May 6, 1952  7 Sheets-Sheet 4

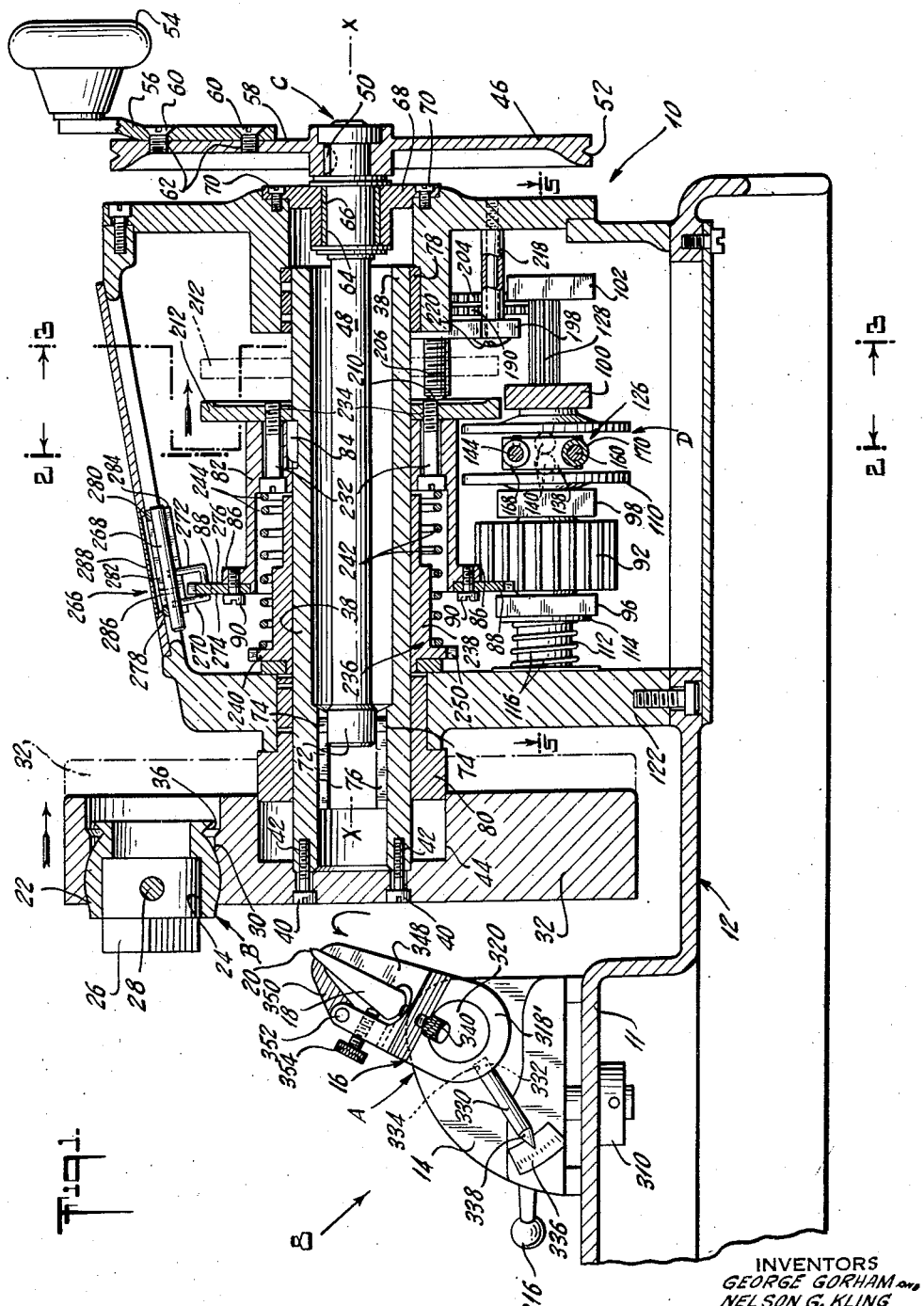

INVENTORS
GEORGE GORHAM AND
NELSON G. KLING
BY
ATTORNEYS

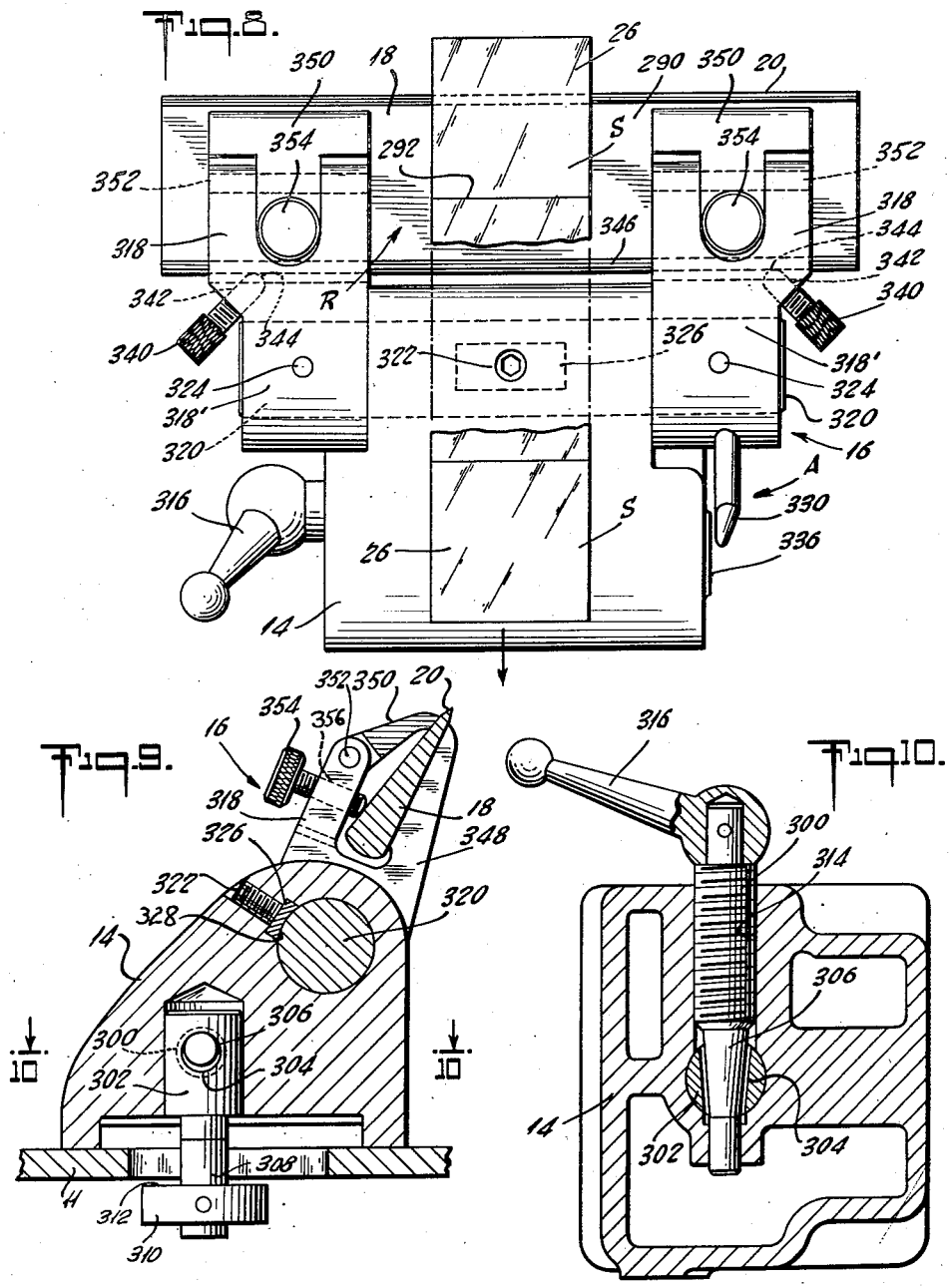

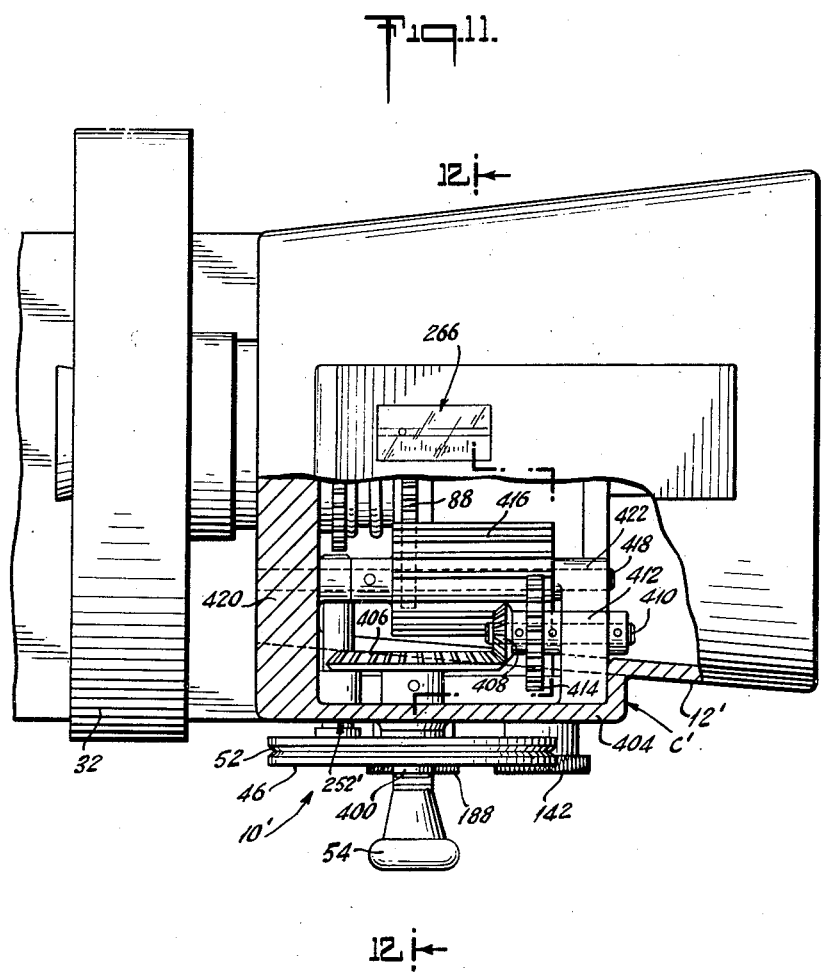

June 18, 1957 G. GORHAM ET AL 2,795,998
MICROTOMES
Filed May 6, 1952 7 Sheets-Sheet 7
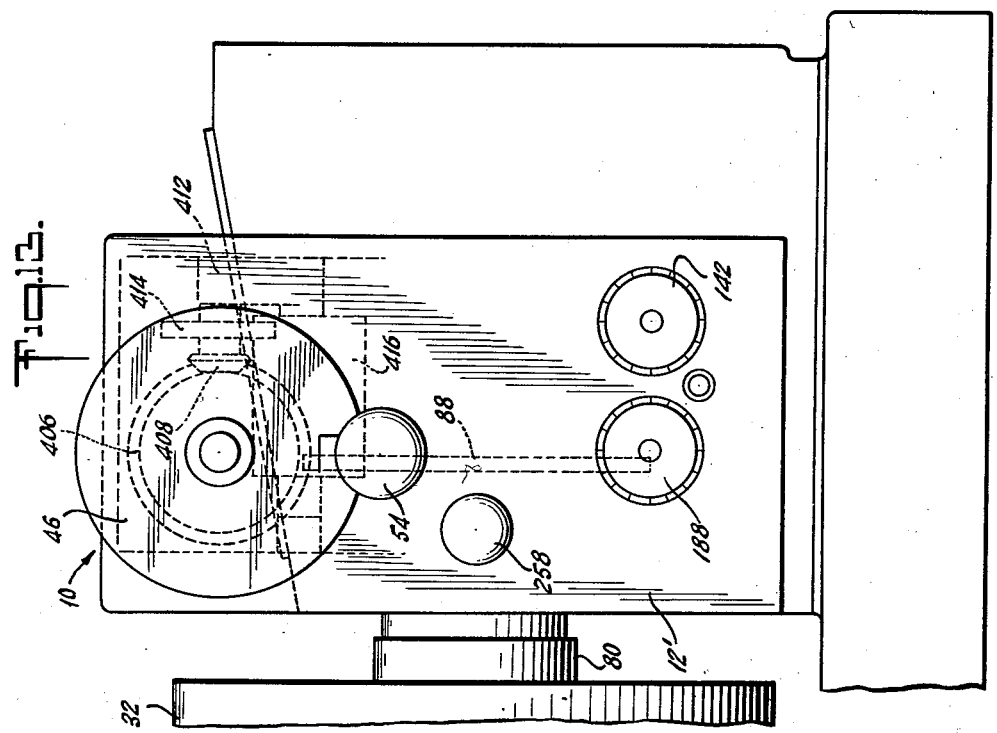
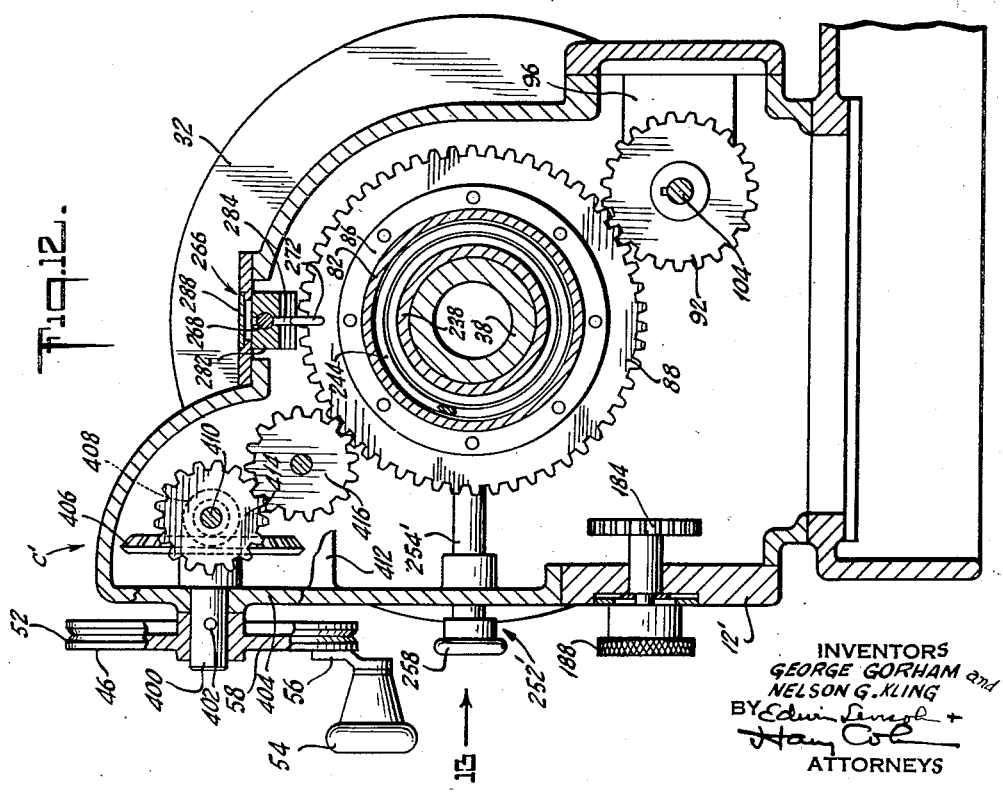
INVENTORS
GEORGE GORHAM and
NELSON G. KLING
BY
ATTORNEYS United States Patent Office 2,795,998
Patented June 18, 1957

2,795,998

MICROTOMES

George Gorham, New York, and Nelson G. Kling, Roslyn, N. Y., assignors, by mesne assignments, to Technicon International Ltd., New York, N. Y., a corporation of New York Application May 6, 1952, Serial No. 286,362

26 Claims. (Cl. 88—40)

This invention relates to improvements in microtomes generally and more particularly to improvements in microtomes of the type having a knife and specimen holder, one of which rotates past the other to slice the specimen.

One object of the present invention is the provision of a microtome of the above type having improved means for advancing the rotating part an accurately predetermined amount during its rotation.

Another object of the present invention is the provision, in a microtome having a part adapted for rotation, of improved means for advancing the part to slice specimens of certain thicknesses, the rate of advance being identical for identical settings of the advancing feed mechanism, and which rate may be accurately adjusted to produce specimens of like thickness or of any desired thickness.

Another object of the present invention is the provision of a microtome having a part adapted for concomitant translation and rotation in which the means for effecting rotation and the means for effecting translation are independent to the extent that thrust forces produced by the rotation of said part will not effect the translation means whereby specimens of accurately predetermined thicknesses may be obtained.

Another object of the present invention is the provision of a microtome having a part adapted for rotation and translation in which there is provided generally improved means for rotating and translating said part.

Another object of the present invention is the provision of a microtome having a part adapted for rotation and translation in which there is provided improved means for controlling the rate of advance or translation of the part, said means also providing a fast return or retraction to return said part to its initial position.

Another object of the present invention is the provision of a microtome having a part adapted for rotation and translation in which there is provided improved means for indicating the translatory position of said part.

Another object of the present invention is the provision of a microtome having a knife holder of generally improved construction.

Another object of the present invention is the provision of a microtome of a generally improved construction which is adapted to efficiently yield specimen sections of accurately predetermined thickness.

The above and other objects, features and advantages of the present invention will be more fully understood from the following description considered in connection with the accompanying illustrative drawings.

In the drawings:

Fig. 1 is a fragmentary longitudinal sectional view of a microtome made according to the present invention;

Fig. 2 is a sectional view taken on the line 2—2 of Fig. 1;

Fig. 3 is a sectional view taken on the line 3—3 of Fig. 1;

Fig. 4 is a fragmentary side elevational view of the microtome;

Fig. 5 is a sectional view taken on the line 5—5 of Fig. 1;

Fig. 8 is a plan view of the microtome knife holder taken in the direction of arrow 8 of Fig. 1;

Fig. 9 is a vertical sectional view of the knife holder shown in Fig. 8; and

Fig. 10 is a sectional view taken on the line 10—10 of Fig. 9.

Fig. 11 is a top plan view with parts broken away, of a microtome according to a modified form of the present invention;

Fig. 12 is a sectional view taken substantially on the line 12—12 of Fig. 11; and Fig. 13 is a side elevational view looking in the direction of the arrow 13 of Fig. 12.

Figure 6:
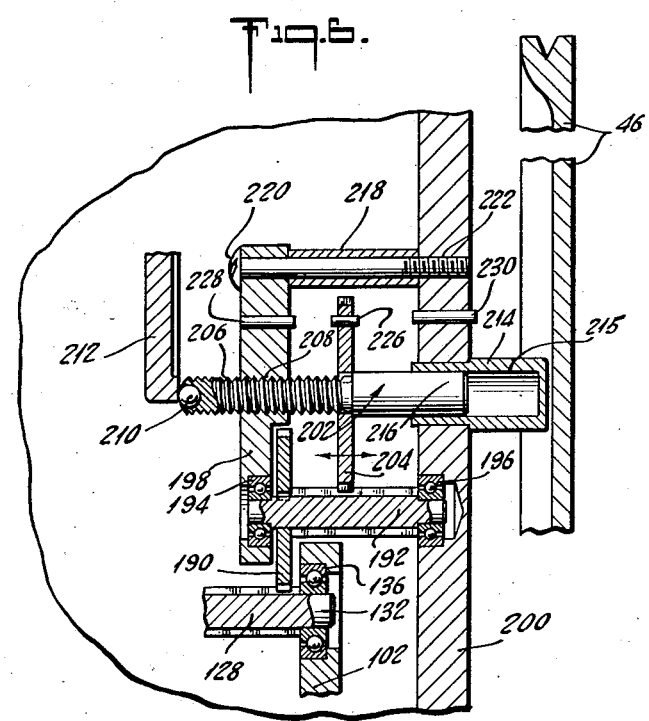
Fig. 6 is a sectional view taken on the line 6—6 of Fig. 3.

The microtome 10, according to the present invention, comprises a knife holder A, a paraffin block holder B, means C for rotating the specimen block holder B and means D for imparting to the specimen block holder B a translatory or rectilinear movement. The knife holder A is adapted to be adjustably mounted to the frame 12 while the specimen block holder B is adapted to be rotated by the rotating means C relative to the knife holder A to slice specimen sections S of accurately predetermined thickness for histological examination.

The knife holder A comprises a main frame or base 14 which is adapted to be adjustably secured to the frame 12 by means to be described, said frame 14 mounting a holder 16 in which is adjustably mounted knife 18 of any conventional construction. The knife edge 20, of blade or cutting implement 18, is adapted to cut thin specimen sections from the specimens embedded in a paraffin block 26 and carried by the specimen block holder B. The holder frame or base 14 is longitudinally adjustably mounted relative to frame 12 of the apparatus by means of the threaded shaft 300 which is adapted to coact with element 302 having a tapered aperture 304 formed complementary to tapered portion 306 of the threaded shaft 300. The element 302 is provided with a projecting portion 308 having a collar member 310 secured thereto, the face 312 of said collar cooperating with adjacent portions of the frame 12 to secure base 14 to said frame. The frame 14 of the holder A is provided with a threaded aperture 314 which is adapted to cooperate with the threaded portion of the shaft 300. Shaft 300 is provided with a lever 316 which is readily accessible for manual actuation. From the above it will be seen that the rotation of shaft 300, by means of lever 316, will be effective to axially move said shaft whereby collar 312 may be releasably secured to adjacent portions of the underside 11 of the frame 12. When shaft 300 is rotated in a locking direction the tapered portion 306 will enter the tapered aperture 304 of element 302 to move the collar 310 closer to underside 11 of frame 12. Conversely, when the lever 316 is rotated in an unlocking direction the shaft 300 will be retracted from element 302 thereby allowing the collar 310 to gravitate away from the frame 12.

The knife holder or clamp 16, which is adjustably mounted on the holder frame or base 14, comprises a pair of generally U-shaped blocks 318, one block being mounted at each end of the shaft 320 and secured thereto by means of pins 324. The blocks 318 are secured to shaft 320 against rotation relative thereto in the same angular relationship whereby the adjustment of shaft 320 in a rotary or angular direction will be effective to correspondingly adjust blocks 318. The shaft 320 is rotatably mounted in the frame 14 of holder A whereby the blocks 318 may be adjusted in a rotary or angular direction. In order to secure shaft 320 and concomitantly the blocks 318 in adjusted angular position relative to the frame 14, there is provided a centrally positioned set screw 322, preferably having an Allen-type head, which bears on the soft metal bearing member 326 to thereby releasably clamp shaft 320 in its adjusted position. It will be understood that the member 326 will be provided with an arcuate face 328 whereby the rotation of the screw 322 in a clamping direction will be effective to clamp said arcuate face against adjacent arcuate portions of shaft 320. Thus the set screw 322 and its associated bearing member 326 provide means for the ready adjustment, in a rotary or angular direction, of the blocks 318 secured outboard at each end of shaft 320.

In order to provide a means for indicating the rotary or angular position of the blocks 318 and consequently knife 18 there is provided an indicating member 330 fixed to the block 318′ in any suitable manner, for example by press-fitting an end portion 332 in a complementary socket 334 in block 318′. The base 14 is provided with a suitable graduated scale 336 which in association with the pointer 338 of the indicating member 330 is adapted to indicate the angular position of the blocks 318 and consequently the angular position of knife 18. Thus the pointer 338, in conjunction with scale 336, provides a ready means for indicating the angularly adjusted position of knife 18 and provides a ready means for guiding the operator in altering the angle of said knife about the axis of shaft 320.

The knife 18 may be adjusted laterally about an axis perpendicular to the plane of said knife by means of adjusting screws 340 associated with each of the blocks 318. The adjusting screws 340 are threadedly received in the apertures 342 of the blocks 318 and are each provided with a tapered end portion 344 which is adapted to coact with adjacent portions of the back edge 346 of the knife 18. It will be understood that each of the screws 340 is independently adjustable whereby the lateral position of knife edge 20 may be readily adjusted about an axis perpendicular to the plane of the knife.

Each of the blocks 318 has at one side a stationary jaw 348 adapted to bear against one side of the knife 18 and at the opposite side a movable jaw 350 which is pivoted to the block 318 at 352 and is adapted to bear at its free end against the knife in the region of its cutting edge 20. A set or clamping screw 354, working in the threaded aperture 356 is adapted to engage one face of the knife in the region of its back edge 346. Thus by tightening the set screws 346, associated with blocks 318, one side of the knife is pressed firmly against the stationary jaw 348 and the free end of the pivoted jaw 350 is pressed forcibly against the other side of the knife adjacent its cutting edge 20. Thus the blocks 318 by means of the set or clamping screws 354 grip end portions of the knife to hold the latter very securely, nevertheless enabling the knife to be quickly adjusted, or removed and replaced. As previously described, the cutting angle of the knife 18 may be readily adjusted by means of the adjusting screw 322 which is adapted to clamp the shaft 320 in any predetermined adjusted position. From the above, it will be understood that the screws 340 are adapted for laterally adjusting the knife, screws 354 are adapted for clamping the knife to the blocks 318, and that screw 322 is adapted to adjust the cutting angle of said knife, it being understood that said cutting angle will be indicated on the scale 336 by means of pointer 338.

The specimen block holder B comprises a casing 22 having a socket 24 which is adapted to receive a conventional paraffin block 26 having a specimen embedded therein. The paraffin block 26 is adapted to be releasably secured in the socket 24 by means of a clamping screw 28, it being understood that a specimen block 26 is positioned in socket 24 and clamping screw 28 is tightened sufficiently to retain said block in the socket 24 of casing 22. The specimen block holder B is adapted to be releasably secured in the socket 30 of flywheel 32, said socket being located laterally to one side of the axis of the flywheel 32. The holder B is retained in socket 30 by means of the clamping screws 34 which are adapted to bear against complementary peripheral portions 36 of the holder B. Thus the specimen block holder B is inserted in the socket 30 of the flywheel 32 and is retained in said position by means of the clamping screws 34 which coact with peripheral portions 36 of said holder.

The flywheel 32, carrying the holder B is adapted to be rotated by rotating means or mechanism C and is adapted to be concomitantly advanced relative to the knife 18, at a predetermined rate, by the advancing means or mechanism D hereinafter to be described. It will be understood that the rotation of flywheel 32 will impart to the holder B a smooth rotary movement due to the inertia effects of said flywheel during said rotation. Thus the flywheel 32, due to its inherent inertia characteristics, will impart to the specimen block 26 a smooth and uniform rotary movement whereby to achieve a smooth and uniform slicing or cutting action.

Flywheel 32 is secured to a hollow shaft 38 in any conventional manner, as by means of screws 40 which are received in the threaded apertures 42 of shaft 38. It will be noted that flywheel 32 and shaft 38 are coaxially mounted and the rotation of shaft 38 will be effective to rotate flywheel 32. Flywheel 32 is centrally recessed at 44 for a purpose which will be evident from the description which follows. In order to effect the rotation of shaft 38 and concomitantly flywheel 32, there is provided rotating means C which comprises a drum 46 having a drive shaft 48 secured thereto and coaxial therewith. The drum 46 is secured to shaft 48 in any conventional manner, as by means of the key 50 which is received in a complementary recess in shaft 48. The drum 46 is in the form of a pulley having a V-groove 52 at its outer periphery which is adapted for the reception of a V-belt when it is desired to power drive the apparatus 10. For convenience in manually rotating the drum 46, there is provided an operating handle 54 having an arm 56 secured to the face 58 of drum 46 in any conventional manner, as by screws 60 which are received in threaded apertures 62 of said drum. It will be readily apparent from the above that the rotation of drum 46 by means of handle 54 will be effective to rotate the drive shaft 48 and the mechanism associated with said drive shaft. The end portion 64 of shaft 48 is mounted in a suitable bearing 66 which is in turn mounted in the bearing block 68 which is secured to the frame 12 by means of the screws 70. The end 72 of shaft 48 is provided with projecting pins 74 which are received in longitudinal slots 76 of shaft 38. From the above it will be seen that the coaxially arranged shafts 38 and 48 may be relatively longitudinally displaced but are locked against relative rotary movement due to the pins 74 being positioned in slots 76. Thus the rotation of shaft 48 will be effective to rotate shaft 38 and the rotation of the former will not effect the longitudinal movement of shaft 38 along the common axis of rotation XX (see Fig. 1). It will be further evident from the above that the thrust forces produced by the rotation of drive shaft 48 will not effect the longitudinal or axial movement or positioning of shaft 38 for the full range of axial movement of shaft 38. Shaft 38 is rotatably mounted relative to the frame 12 by means of the bearing 78 at one side of the apparatus and the bearing part 80 at the opposite side of the apparatus, said bearing 78 and said bearing part 80 being fixed to frame 12 in any desired manner. The flywheel 32 is adapted to be axially or longitudinally advanced from the dot and dash line position shown in Fig. 1 to the solid line position for the slicing of a section S from the paraffin block 26. The recess 44 of the flywheel 32 is adapted to receive the bearing part 80 of frame 12, which bearing part acts as a guide for the flywheel for its range of translatory motion. From the above it will be seen that the rotation of drum 46 will be effective to rotate the flywheel 32 and that said flywheel may be translatorily moved during its rotation within a predetermined range whereby flywheel 32 may be concomitantly rotated and advanced or retracted. The means D for advancing or retracting the flywheel 32 during its rotation comprises a train of mechanism now to be described which is actuated on the rotation of drum 46.

The mechanism D comprises an annular member 82 which is keyed to the shaft 38 by means of key 84. The member 82 has an annular flange 86 at one end thereof, said flange having a gear 88 secured thereto in any conventional manner as by means of the screws 90.ABr 88 is in mesh with the gear 92 whereby the rotation of shaft 48 will be effective to rotate gear 92 which is associated with the frame 12 in a manner to be described in detail below.

With reference to Fig. 5, there is shown a plate 94 which constitutes part of frame 12 and is provided with a plurality of spaced projecting legs 96, 98, 100 and 102 which are adapted to mount the mechanism about to be described. The gear 92 is secured to a shaft 104 which has its end portions mounted in suitable bearings 106 and 108, said bearings having their outer peripheries mounted in the legs 96 and 98, respectively, in any conventional manner. Shaft 104 has a driving plate 110 secured to one end whereby the rotation of gear 92 will be effective to rotate plate 110 as will be readily apparent. In order to urge shaft 104 and consequently plate 110 to the right, as viewed in Fig. 5, there is provided a tubular member 112 having an annular flange portion 114 which abuts the bearing 106 at one side thereof. Surrounding the tubular member 112 is a compression spring 116 which bears against flange 114 at one end and has its other end seated in a complementary recess 118 of part 120 secured to the part 122 of frame 12. As shown in Fig. 5, the parts 120 and 122 are provided with complementary threads whereby the compression of spring 116 may be adjusted by the rotation of part 120 relative to the part 122. It will be understood that spring 116 will be effective to urge the tubular member 112 and concomitantly plate 110 to the right, as viewed in Fig. 5. The rotation of plate 110 is adapted to rotate the driver plate 124 through the medium of a variable speed device 126 to be described below. The plate 124 is formed integral with the gear 128 which has shaft portions 130 and 132 which are received in bearings 134 and 136, respectively, secured to the legs 100 and 102, respectively, of frame 12. Thus gear 128 is rotatably mounted relative to frame 12 by means of the bearings 134 and 136 and the rotation of plate 110 will be effective to rotate gear 128 through the intermediation of the variable speed device 126 about to be described.

With reference to Figs. 2 and 5, the variable speed device 126 comprises a block member 138 carrying a pair of balls 140 which are in surface to surface contact relation with each other internally of said block member. Each of the balls or spheres 140 is also in surface contact with the confronting faces of plates 110 and 124 whereby the rotation of plate 110 will be effective to rotate plate 124 when the balls 140 are displaced from the axis of rotation of shaft 104. Thus the balls 140 are in surface contact with each other as well as being in surface contact with their associated plates 110 and 124 whereby the rotation of shaft 104 will be effective to rotate gear 128 when balls 140 are displaced radially from the axis of plate 124, for example to the position 140'. The transverse movement of the block member 138 and its associated balls 140 relative to the axis of rotation of plate 110 will be effective to vary the speed between the plates 110 and 124 in a manner to be described. With the balls 140 positioned in the solid line position shown in Fig. 5, the plate 124 will be declutched from, or stationary relative to, plate 110 since balls 140 are coaxially positioned relative to plate 110. On the movement of the balls 140 of block member 138 from the solid line position to the dot and dash line position 140' the rotation of plate 110 will be effective to rotate plate 124, the speed of plate 124 increasing as the radial distance of the block member 138 from the axis of plate 110 is increased. Similarly, as the block member 138 is moved outwardly of the axis of rotation of plate 110 the relative speed of plate 124 relative to plate 110 will increase at an increasing rate with the rate of increase being the greatest when the block member 138 is spaced at an extreme position from the axis of rotation of the plate 110. It will therefore be apparent that for a quick return of the flywheel 32 from its fully advanced position to its retracted position and for a quick advance to a cutting position, it is desired that block member 138 be displaced from the axis of rotation of plate 110 a maximum amount and for this purpose there is provided a control knob 142 which is adapted to be moved from the solid line position, shown in Fig. 2, to the broken line position indicated at 142'. In order to adjust the transverse position of block member 138 relative to the axis of rotation of plate 110 there is provided an adjusting shaft 144 which is threaded at 146, said threaded portion being adapted to cooperate with the threaded aperture 148 in block member 138. The adjusting shaft 144 is journalled for rotation in the bearings 150 and 152 secured to the projecting parts 154 and 156, respectively, which are formed integral with the leg 100 of the frame 12. It will be apparent that the rotation of the adjusting shaft 144 will be effective to move the block member 138 longitudinally of said shaft whereby to vary the speed of rotation of plate 124 relative to plate 110. The adjusting shaft 144 is secured to the externally accessible control knob 142 in any conventional manner, as by means of pin 158, said knob being adapted to facilitate the manual rotation and adjustment of the shaft 144 for controlling the speed of rotation of plate 124. In order to guide the block member 138 for movement axially of the shaft 144 there is provided a guide shaft 160 which has its end portions 162 and 164 positioned in the projecting parts 154 and 156, respectively, of the leg 100. The block member 138 is provided with an arcuate longitudinal guideway 166 which is adapted to cooperate with peripheral portions of the guide shaft 160 to guide block member 138 for its full range of movement. Secured to the adjusting shaft 144 in any desired manner is a stop collar 168 which cooperates with end portions of the block member 138 to limit the movement of said block member in a direction to increase the speed of rotation of plate 124. Thus to increase the speed of rotation of plate 124 the control knob 142 is rotated in a direction to move the balls 140 away from the axis of rotation of plate 110 and this movement will be limited by the engagement of block member 138 against stop collar 168. It will be understood that the stop collar acts to limit the movement of block member 138 when the control knob 142 is in a full line position as shown in Fig. 2 and that said control knob will normally be in a full line or "in" position for controlling the thickness of the specimen section S to be sliced from the specimen block 26 during the advancing movement of flywheel 32. In order to rapidly advance the flywheel 32 to the knife 18 and to provide for the quick retraction of the flywheel 32 to its initial position the control knob 142 is manually moved in an outward direction to the position 142' whereby the balls 140 will be moved to a position radially outwardly of their position when the control knob is in its "in" position. Thus with the control knob in position 142' the block member 138 will be moved transversely outwardly of the axis of rotation of plate 110 to a position where the balls 140 will be adjacent the outer periphery of plate 110. It will be understood that the movement of control knob 142 to the position 142' will result in correspondingly moving balls 140 to thereby rapidly increase the speed of rotation of plate 124 relative to plate 110. When the shaft 144 is axially displaced due to the movement of the control knob 142 to the position 142', the stop collar 168 will be correspondingly axially displaced whereby it will be ineffective to act as a stop means for limiting the adjustment of the block member 138. In order to limit the radial movement of the balls 140 relative to plate 110 when control knob 142 is in position 142', there is provided a stop collar 170 which is secured to the guide shaft 160 by means of the pin 172. Thus with the control knob in position 142' the stop collar 170 will be effective to limit the movement of the block member 138 in a radial direction relative to the plate 110. It will be understood that the stop collars 168 and 170 aforedescribed will be effective to limit the adjustment of member 138 whereby to prevent the balls 140 from being displaced from surface contact with the plates 110 and 124 to thus prevent said balls from being displaced from the block member 138. From the above, it will be apparent that the rotation of the control knob 142 will be effective to control the speed of rotation of plate 124 and its associated mechanism and that said speed may be controlled within two distinct ranges as governed by the axial position of the control knob 142, the "in" position constituting the range for adjustment of the thickness of the slice of the specimen section S to be cut and the "out" position 142' constituting a high speed range to provide for a fast return or retraction of flywheel 32 and to provide for a fast advance of said flywheel to a cutting position. Shaft 144 is peripherally grooved at 174 for the reception of a spring projected ball 176 which constitutes detent means for the control knob 142 in the "in" position or low speed range position. Thus the spring driven ball 176 will be received in the peripheral groove 174 when the control knob 142 is in the "in" position whereby a deliberate axial force will be required to move the control knob 142 to position 142'.

Intermediate the ends of the adjusting shaft 144 there is secured an elongated gear 178 which is in mesh with a gear 180 having a gear 182 integral therewith. Gears 180 and 182 constitute idler gears and are adapted to transmit their motion to gear 184 which is in mesh with gear 182. It will be noted that gears 178 and 182 are of relatively small diameter whereas gears 180 and 184 are of relatively large diameter whereby for each revolution of shaft 186 of gear 184, shaft 144 of gear 178 will be rotated more than one revolution as determined by the relative diameter of the gears in the aforedescribed gear train. Thus shaft 144 will constitute the fine adjustment for adjusting the speed of rotation of plate 124 and shaft 186 will constitute the coarse adjustment for adjusting the speed of rotation of said plate. As aforedescribed, control knob 142 is secured to the shaft 144 whereby said control knob which is accessible externally of the apparatus, as best shown in Fig. 4 constitutes the fine adjusting control for the speed of rotation of plate 124 and its associated mechanism for advancing and retracting flywheel 32. Similarly, a control knob 188 is secured to shaft 186 in any conventional manner whereby said control knob constitutes a companion speed control to the knob 142. It will be understood that suitable pointers and scales will be associated with the knobs 142 and 188 whereby the adjustment of said knobs will control the rate of advancement and retraction of flywheel 32. The aforementioned scales associated with the control knobs 142 and 188 will preferably be graduated in microns whereby the movement of the control knobs 142 and 188 one micron, as indicated by their associated scales, will correspondingly move the flywheel 32 one micron in an axial direction for each revolution of said flywheel. From the above, it will be apparent that the knobs 142 and 188, which are accessible externally of the apparatus, will constitute means to control the rate of axial movement of the flywheel 32 to thereby control the thickness of the specimen section S sliced from the specimen block 26.

Gear 128 operatively associated with plate 124 is in mesh with gear 190 fixed to shaft 192 which is journalled for rotation in bearings 194 and 196 secured to the parts 198 and 200, respectively. Control shaft 202 is provided with a gear 204 secured at an intermediate portion thereof, which latter gear is in mesh with the elongated gear 192 which is driven by gear 128. Control shaft 202 has a threaded portion 206 which is adapted to be threadedly received in aperture 208 of part 198 which is threaded complementary to the threaded portion 206. At the end of the threaded portion 206 of the control shaft 202 there is provided a hardened steel ball 210 which is adapted to cooperate with annular plate 212 in a manner to be described in detail hereinafter. It will be apparent that the rotation of gear 204 will be effective to axially move shaft 202, which axial movement will be transmitted to plate 212. In order to guide shaft 202 for axial movement there is provided a guide socket 214 which is secured to the part 200 of frame 12. The end portion 216 of the control shaft 202 is adapted to be received in the central aperture 215 of the socket 214 whereby said socket and said end portion constitute guide means for the axial movement of shaft 202. It therefore appears evident from the above that the rotation of plate 124 will be effective to rotate shaft 202 through the intermediation of gears 128, 190, 192 and 204, the rotation of said shaft 202 axially displacing the latter in a direction and by an amount corresponding to the direction of rotation of plate 124 and the speed of rotation thereof. It will be noted that part 198 is spaced from part 200 by means of spacers 218 which are positioned between said parts, said part 198 being secured in position by means of bolts 220 which pass through the parts 198 and spacers 218 and are received in apertures 222 of part 200 which are threaded complementary to said bolts. If desired, part 198 may be slotted as indicated at 224 in Fig. 3 whereby to provide a tension adjustment for shaft 202 relative to part 198. For this purpose there is provided an adjusting screw 226 which is adapted to control the clamping force of part 198 on adjacent portions of the threaded part 208 of shaft 202, as will be readily understood. It will be noted that gear 192 is elongated whereas gear 204 is relatively narrow whereby to provide for the rotation of gear 204 by gear 192 for the full range of axial movement of shaft 202. Gear 204 is provided with a pin 226 which is adapted to cooperate with pins 228 and 230 fixed to the parts 198 and 200, respectively, to limit the axial movement of gear 204 and consequently the axial movement of shaft 202. It will be understood from the above that pin 228 will coact with pin 226 to limit the axial advance of shaft 202 whereas pin 230 of part 200 will coact with pin 226 to limit the axial movement of shaft 202 in a retracting direction. Thus on the rotation of drum 46 the plate 124 will be rotated at a speed governed by the setting of knobs 142 and 188 and the rotation of said plate in turn will be effective to rotate shaft 202 to axially move ball 210.

The annular plate 212 is secured to the annular member 82 in any conventional manner, as by means of the bolts 232 which are received in the threaded apertures 234 of the annular plate 212. As aforenoted in detail, shaft 38 and member 82 are keyed to each other whereby the axial movement of the annular plate 212 will be effective to correspondingly axially move the hollow shaft 38 to thereby move the flywheel 32 a corresponding amount along the axis XX. Thus the axial movement of the ball 210 will axially move the flywheel 32, through the intermediation of plate 212 and member 82 and shaft 38 which are keyed together, the direction and rate of axial movement of flywheel 32 being governed by the direction of rotation of drum 46 and the setting of knobs 142 and 188.

Rotatably mounted with the shaft 38, at an intermediate portion thereof, is an annular member 236 having a body portion 238 and an annular flange 240, the latter providing an abutment for one end of the compression spring 242. The opposite end 244 of the compression spring 242 coacts with adjacent face portions of member 82 whereby said spring biases the member 82 to the right, as viewed in Fig. 1, or in a retracting direction. Thus spring 242 is effective to urge flywheel 32 and its associated mechanism in a retracting direction and to eliminate play in the translation gear train. During the advance of fly wheel 32, spring 242 will be compressed whereby the translation mechanism will be free from play and the thickness of the specimen section S may be controlled within accurately predetermined limits.

Figure 7:
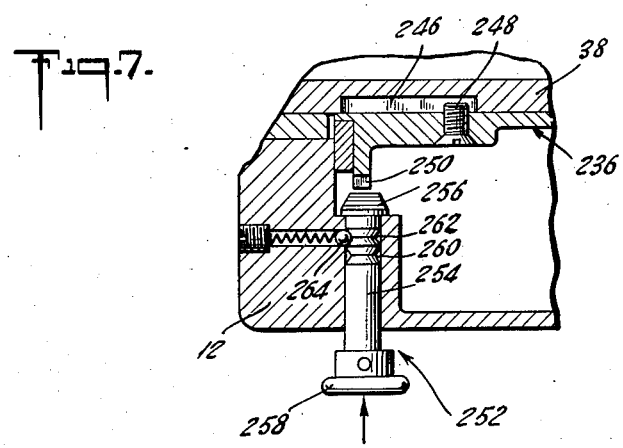
Fig. 7 is a sectional view taken on the line 7—7 of Fig. 4.

With reference to Fig. 7, it will be noted that the shaft 38 is longitudinally slotted at 246 for the reception of a complementary pin 248 which is secured to the annular member 236. Thus the shaft 38 and the annular member 236 are locked against relative rotation whereas the shaft 38 is free for axial or translatory movement within the limits controlled by the travel of pin 248 in slot 246. Thus the annular member 236 is mounted for rotation with the shaft 38 but is secured against axial movement whereas the shaft 38, which is locked in common rotation with the annular member 236, is free for rectilinear or translatory movement relative to the annular member 236.

The annular flange 240 of the member 236 has secured thereto gear 250 which is adapted to cooperate with the flywheel locking mechanism 252 about to be described. In order to lock the flywheel 32 in fixed position, as when mounting the specimen block 26 in the specimen block holder B, there is provided a shaft 254 having a locking portion 256 at one end which is adapted to be received between a pair of adjacent teeth of gear 250 for locking the annular member 236 and its associated train of mechanism. The shaft 254 is mounted in frame 12 for axial movement and is provided with a control knob 258 which is fixed to shaft 254 in any conventional manner, said knob being accessible externally of the apparatus and being adapted for manual operation to control the locking and unlocking of flywheel 32. Shaft 254 is provided with a pair of spaced peripherally extending grooves 260 and 262 which are adapted to cooperate with the spring projected ball 264 mounted in frame 12. Thus ball 264 constitutes detent means for shaft 254, said ball being received in groove 262 in the unlocked position of flywheel 32 and said ball being received in groove 260 in the locked position of said flywheel. It will be readily apparent that when the knob 258 is in the "in" position the annular member 236 will be locked against rotation to thereby lock the shaft 38 against rotation, which shaft has the flywheel 32 secured thereto.

In order to indicate the position of flywheel 32 relative to the axis XX to thereby determine its translatory position there is provided indicating means 266 which is visible externally of the apparatus. The indicating means 266 comprises a shaft 268 having a pair of spaced projecting arms 270 and 272 which are adapted to cooperate with the faces 274 and 276, respectively, of gear 88. Thus gear 88 is positioned between the arms 270 and 272 whereby the translatory movement of gear 88 and its associated train of mechanism will be imparted to shaft 268 (see Fig. 1). The shaft 268 is guided for longitudinal or axial movement in the bearing parts 278 and 280 of the stationary block 282 which is fixed to the frame 12 in any suitable manner. It will be noted in Fig. 2 that the stationary block 282 is slotted at 284 and arms 270 and 272 extend through said slot. The movable shaft 268 is provided with an indicating element 286 which is visible externally of the apparatus 10 through any suitable window means 288. Thus the indicating element 286 will give a continuous reading of the translatory position of flywheel 32, it being understood that said indicating element will have associated therewith a suitable scale which may be formed in the window 288. It will be further apparent from the above that the position indicating means 266 will be effective to indicate the position of the flywheel 32 in both the advancing and retracting directions since arms 270 and 272 straddle the gear 88.

In practice, the specimen embedded in a paraffin block 26 is secured to the holder B and the latter is secured in position on the flywheel 32 in the manner aforedescribed. The flywheel 32 will be released for rotation by manipulating knob 258 to the "out" position, as shown in Fig. 7, and said flywheel will be advanced to a cutting position adjacent the region of edge 20 of knife 18. As aforedescribed in detail, the knob 142 will be manipulated to its "out" position to obtain a fast advance to the aforenoted cutting position. The rotation of drum 46, by means of the handle 54, will be effective to rotate said flywheel and to axially move the latter, the rate of said axial movement being under the control of the knobs 142 and 188 which are in turn effective to control the rate of advance of shaft 202 relative to the speed of rotation of the flywheel. After the flywheel 32 is initially moved to the cutting position aforedescribed, in which the specimen block 26 is adjacent the edge 20 of knife 18, the knobs 142 and 188 are set for the thickness of the specimen section S desired and the drum 46 is rotated to concomitantly rotate the specimen block 26 and to advance the latter continuously by the amount set by the knobs 142 and 188. It will be understood that if, for example, the knobs 142 and 188 are set for four microns, flywheel 32 will be advanced four microns for each revolution of the latter. The thickness of the paraffin section to be cut or sliced may be adjusted at any time with the apparatus either in the operative or the inoperative condition and during said cutting or slicing, knob 142 will be in the "in" position. It will be understood that the specimen sections S cut by the knife 18 during the rotation of flywheel 32 will be identical for identical settings of the knobs 142 and 188 and furthermore paraffin sections of any desired thickness within the design limits of the apparatus may be obtained. After the completion of the operation of cutting the specimen sections from the block 26, the flywheel 32 will be retracted to its initial position, which retraction may be effected in a rapid manner by the manipulation of the knob 142 to its "out" position, as aforedescribed.

The knife edge 20, of the knife 18, is so arranged relative to the paraffin block 26 that said knife edge will be substantially parallel to the edge of the paraffin section which is last to be severed from the block 26 whereby when the paraffin section ribbons are formed they will be deposited along the surface 290 of the knife holder A, centrally thereof, to facilitate the further handling of said ribbon. Thus the specimen block 26 and the knife 18 are so positioned relative to each other that the edge 292 of specimen section S is substantially parallel to knife edge 20 upon being severed from block 26 whereby a ribbon R will be formed running substantially centrally of the knife holder A (see Fig. 8). In order to achieve the above result, the knife edge 20 of knife 18 is positioned slightly above the axis XX of rotation of flywheel 32, although it will be understood that said knife may be otherwise positioned, if desired. It will also be understood that knife holder A will be transversely displaced relative to the axis of rotation of the flywheel whereby the knife 18 will be disposed in the path of the circle of travel of the block 26.

In the slicing of paraffin sections S from the paraffin block 26 said block will be continually advanced during its rotation resulting in said paraffin sections being tapered an infinitesimal amount although it will be readily apparent that for all intents and purposes said sections will be of uniform thickness. Thus since the block 26 is advanced in increments of microns which are 1/25000 of an inch and since the cutting or slicing of said block takes place for a relatively small angular distance during the rotation of the flywheel, the variance of the thickness of the sections S will be so infinitesimal that said sections may be considered as of uniform thickness as a practical matter.

Thus it will be seen that the above described microtome 10 is provided with improved means or mechanism D for advancing flywheel 32 an accurately predetermined amount during its rotation. The rate of advance of the flywheel 32, during its rotation, will be identical for identical settings of the knobs 142 and 188 of the advancing feed mechanism and said rate may be accurately adjusted to produce specimens of like thickness or of any desired thickness. The means C for rotating flywheel 32 and the means D for advancing said flywheel are independent to the extent whereby the thrust forces produced by the rotation of shaft 48 will not effect the translation means D whereby specimens of accurately predetermined thickness may be obtained. The block member 138 and its associated mechanism provides an extremely efficient means for controlling the rate of advance or translation of flywheel 32 and also provides for the fast translation of said flywheel to return the latter to its initial position and to advance said flywheel to a cutting position. The indicating means 266 provides a ready means for indicating the translatory position of the flywheel 32 for its full range of translatory movement.

With reference to Figs. 11 through 13, there is shown a microtome 10', according to a modified form of the present invention, which is structurally similar to microtome 10 except for the rotating means C' for rotating shaft 38 and consequently flywheel 32. Rotating means C', of microtome 10', comprises a drum 46 which is secured to the shaft 400 in any conventional manner, as by means of key 402, said drum 46 being structurally identical with drum 46 of microtome 10. Thus the drum 46 is in the form of a pulley having a V-groove 52 at its outer periphery which is adapted for the reception of a suitable belt when it is desired to power drive the microtome. It will be readily apparent that the rotation of drum 46 by means of handle 54 will be effective to rotate the shaft 400 and the mechanism associated with said shaft.

The shaft 400 is journaled for rotation in the portion 404 of the frame 12'. Keyed to shaft 400, internally of frame 12', is a bevel gear 406 which is in mesh with a complementary bevel gear 408 which is fixed to the shaft 410, the latter being journaled for rotation in the portion 412 formed integral with portion 404. Secured to shaft 410 in any conventional manner is a gear 414 which is laterally spaced from the bevel gear 408, said gear 414 being in mesh with the idler gear 416 which is fixed to shaft 418 in any conventional manner, the ends of said latter shaft being journaled for rotation in the portions 420 and 422 of the frame 12'. The gear 416 is in mesh with gear 88, the latter gear and its associated train of mechanism being structurally identical as in microtome 10. The gear 416 is elongated as shown in Fig. 11 in order to provide a driving means for gear 88, the latter being adapted for translatory movement in the manner aforedescribed. It will be apparent from the above that the rotation of drum 46 will be effective to rotate the associated pair of bevel gears 406 and 408, the latter gear being effective to rotate gears 414 and 416, with the gear 416 being adapted to rotate gear 88 whereby it will be seen that the rotation of drum 46 will be effective to rotate and axially move the flywheel 32. Thus flywheel 32 may be concomitantly rotated and advanced or retracted in the manner aforedescribed in detail. It will be noted that rotating means C' dispenses with the drive shaft 48 of microtome 10 and said rotating means has the drum 46 positioned at one side of the apparatus whereas rotating means C of microtome 10 has the drum 46 positioned at the end of the apparatus remote from the flywheel. The means 252' for locking the flywheel 32 in fixed position is structurally identical with mechanism 252 in microtome 10, except that shaft 254' is longer than shaft 254 of the locking mechanism 252. In all other respects, the flywheel locking mechanisms 252 are structurally identical. Any suitable gear ratio between gear 406 and gear 88 may be used, said gear ratio preferably being so designed that one revolution of drum 46 will be effective to rotate gear 88 one revolution. From the above, it will be seen that the rotary driving means 416 and the gear 88, which is associated with gear 416, are relatively movable longitudinally and restrained against relative rotation whereby to inhibit transmission of endwise thrust to the gear 88.

Both microtome 10 and 10' are provided with a part for rotating member 38 with respect to which shaft or member 38 is longitudinally movable during the rotation thereof, said part being the shaft 48 in microtome 10 and gear 416 in microtome 10'.

While we have shown and described the preferred embodiments of our invention, it will be understood that various changes may be made in the present invention without departing from the underlying idea or principles of the invention within the scope of the appended claims.

Certain features which are shown but not claimed herein are claimed in our divisional application, Ser. No. 627,600, filed December 11, 1956.

Having thus described our invention, what we claim and desire to secure by Letters Patent, is:

1. A microtome comprising a cutting implement part and a specimen holder part, one of which parts rotates for cutting a specimen section, means for concomitantly rotating and translating said rotary part, said means comprising a pair of concentrically arranged shafts being relatively movable longitudinally and restrained against relative rotation, means for translating one of said shafts during its rotation, said other shaft being operatively connected to said one shaft whereby on the rotation of said other shaft said one shaft will be rotated and translated, said rotary part being secured to said translating shaft, said translating means comprising an annular member in fixed relation with said translating shaft and screw means rotated in response to the rotation of said shafts, the rotation of said screw means being effective to axially move the latter, said annular member being disposed in engagement with said screw means whereby the rotation of said shafts will be effective to axially move said annular member to thereby longitudinally move said rotary part relative to said other part.

2. A microtome comprising a cutting implement part and a specimen holder part, one of which parts rotates for cutting a specimen section, means for concomitantly rotating and translating said rotary part, said means comprising a pair of concentrically arranged shafts being relatively movable longitudinally and restrained against relative rotation, means for translating one of said shafts during its rotation, said other shaft being operatively connected to said one shaft whereby on the rotation of said other shaft said one shaft will be rotated and translated, said rotary part being secured to said translating shaft, and means for adjusting the rate of translation or longitudinal movement of said translating shaft relative to its rate of rotation, said adjusting means comprising a pair of spaced plates having laterally offset axes of rotation and means for transmitting motion between said plates, said means being transversely movable relative to said axes of rotation to adjust the relative speed of rotation of said spaced plates, said plates being interposed in said translating means and operatively connected to said translating shaft and rotatable thereby.

3. A microtome comprising a cutting implement part and a specimen holder part, the latter part being rotatable for cutting a specimen section, means for concomitantly rotating and translating said rotary part, said means comprising a pair of concentrically arranged shafts being relatively movable longitudinally and restrained against relative rotation, means for translating one of said shafts during its rotation, said other shaft being operatively connected to said one shaft whereby on the rotation of said other shaft said shaft will be rotated and translated, said rotary part being secured to said translating shaft, said translating means comprising a pair of spaced plates having laterally offset axes of rotation and means for operatively connecting said plates, said means being transversely movable relative to said axes of rotation to adjust the relative speed of rotation of said spaced plates, an annular member in fixed relation with said translating shaft and screw means rotated in response to the rotation of said shafts, the rotation of said screw means being effective to axially move the latter, said plates and said screw means being operatively interconnected whereby the rotation of said plates is effective to rotate said screw means, the latter in turn being operatively interconnected with said annular member to axially move the latter whereby the rotation of said shafts will be effective to axially move said annular member and said rotary part.

4. A microtome comprising a cutting implement part and a specimen holder part, one of which parts rotates for cutting a specimen section, means for concomitantly rotating and translating said rotary part, said means comprising a pair of concentrically arranged shafts being relatively movable longitudinally and restrained against relative rotation, means for translating one of said shafts during its rotation, said other shaft being operatively connected to said one shaft whereby on the rotation of said other shaft said one shaft will be rotated and translated, said rotary part being secured to said translating shaft, and means for adjusting the rate of translation or longitudinal movement of said translating shaft relative to its rate of rotation, said adjusting means comprising a pair of spaced plates having laterally offset axes of rotation and means for transmitting motion between said plates, said means being transversely movable relative to said axes of rotation to adjust the relative speed of rotation of said spaced plates, said plates being interposed in said translating means and operatively connected to said translating shaft, said motion transmitting means comprising a member carrying a pair of ball elements in mutual surface-to-surface contact, and in surface contact with the confronting faces of said plates, said block member being transversely movable relative to said axes of rotation whereby to transversely move said pair of ball elements relative to said axes of rotation.

5. In a microtome, a flywheel having provision for mounting a specimen holder and means for concomitantly rotating and translating said flywheel, said means comprising a pair of concentrically arranged shafts being relatively movable longitudinally and restrained against relative rotation, the outer one of said shafts being secured to said flywheel, said outer shaft being longitudinally slotted and the other one of said shafts having means adapted to ride in said slot whereby the rotation of said other shaft will be effective to rotate said flywheel, a driving plate operatively connected to said outer shaft and driven thereby, a driven plate operatively associated with said driving plate and driven thereby, screw means rotated by said driven plate, the rotation of said screw means being effective to axially move the latter, a member in fixed relation with said outer shaft and adapted to be axially displaced by the axial movement of said screw means, whereby the rotation of said shafts will be effective to longitudinally move said outer shaft and said flywheel carried thereby.

6. In a microtome, a flywheel having provision for mounting a specimen holder and means for concomitantly rotating and translating said flywheel, said means comprising a pair of concentrically arranged shafts being relatively movable longitudinally and restrained against relative rotation, the outer one of said shafts being secured to said flywheel, and the other one of said shafts being drivingly connected to said outer shaft whereby the rotation of said other shaft will be effective to rotate said flywheel, a driving plate operatively connected to said outer shaft and driven thereby, a driven plate operatively associated with said driving plate and driven thereby, screw means rotated by said driven plate, the rotation of said screw means being effective to axially move the latter, a member in fixed relation with said outer shaft and adapted to be axially displaced by the axial movement of said screw means, whereby the rotation of said shafts will be effective to longitudinally move said flywheel, and means for adjusting the rate of translation of said flywheel relative to its rate of rotation, said adjusting means comprising a block member carrying a pair of ball elements being in surface engagement with the confronting faces of said plates, said plates having laterally offset axes of rotation, said block member being transversely movable relative to said axes of rotation whereby to transversely move said pair of ball elements relative to said axes of rotation, and manually operable screw means for transversely moving said block member relative to said axes of rotation.

7. In a microtome, a rotary and axially movable part on which to mount a specimen for cutting sections therefrom, means for rotating and translating said part for successive cutting operations comprising a first member which is rotatably and axially movable and operatively connected to said specimen-mounting part for rotating the latter and for translating the same to advance said part for the successive cutting operations, means operatively connected to said first member for rotating the latter, including a second rotary member which is disposed transversely of said first member, and means operatively connected to said first member independently of said rotating means to advance said specimen-mounting part for the cutting operations independent of said rotating means, whereby to inhibit transmission of endwise thrust from said rotating means to said first member.

8. In a microtome, a rotary and axially movable part on which to mount a specimen for cutting sections therefrom, means for rotating and translating said part for successive cutting operations comprising a member which is rotatably and axially movable and operatively connected to said specimen-mounting part for rotating the latter and for translating the same to advance said part for the successive cutting operations, means operatively connected to said member for rotating the latter, said means for rotating said member comprising a part with respect to which said member is longitudinally movable during the rotation thereof whereby to inhibit transmission of longitudinal thrust to said member by said rotating means, and means operable under the control of said rotating means for moving said member longitudinally thereof to thereby translate said first mentioned part for said cutting operations.

9. In a microtome, a rotary and axially movable part in which to mount a specimen for cutting sections therefrom, means for rotating and translating said part for successive cutting operations comprising a member which is rotatably and axially movable and operatively connected to said specimen-mounting part for rotating the latter and for translating the same to advance said part for the successive cutting operations, means operatively connected to said member for rotating the latter continuously during the translation thereof, said rotating means comprising a plurality of parts which are rotated continuously during the rotation and translation of said member, one of said last mentioned parts and said member being relatively movable longitudinally of the latter during the rotation thereof whereby to inhibit transmission of longitudinal thrust to said member by said rotating means, and means operable under the control of said rotating means for moving said member longitudinally thereof to thereby translate said first mentioned part for said cutting operations.

10. In a microtome, a rotary and axially movable part on which to mount a specimen for cutting sections therefrom, means for rotating and translating said part for successive cutting operations comprising a member which is rotatably and axially movable and operatively connected to said specimen-mounting part for rotating the latter and for translating the same to advance said part for the successive cutting operations, means operatively connected to said member for rotating the latter, said means for rotating said member comprising a part with respect to which said member is longitudinally movable, and means operable by said rotating means continuously during operation of the latter for specimen-cutting and operatively connected to said member for moving the latter longitudinally in specimen-advancing direction whereby said first mentioned part is advanced continuously in said direction during the rotation thereof for said cutting operations, and a stationary cutting implement part disposed in relation to said first mentioned part.

11. In a microtome, a rotary and axially movable part on which to mount a specimen for cutting sections therefrom, means for rotating and translating said part for successive cutting operations comprising a member which is rotatably and axially movable and operatively connected to said specimen-mounting part for rotating the latter and for translating the same to advance said part for the successive cutting operations, means operatively connected to said member for rotating the latter, and means operable by said rotating means continuously during operation of the latter for specimen-cutting and operatively connected to said member for moving the latter longitudinally in specimen-advancing direction whereby said first mentioned part is advanced continuously in said direction during the rotation thereof for said cutting operations, and manually operable means for adjusting the rate of advance of said member in relation to the rate of rotation thereof.

12. In a microtome, a rotary and axially movable part on which to mount a specimen for cutting sections therefrom, means for rotating and translating said part for successive cutting operations comprising a member which is rotatably and axially movable and operatively connected to said specimen-mounting part for rotating the latter and for translating the same to advance said part for the successive cutting operations, means operatively connected to said member for rotating the latter, and means operable by said rotating means continuously during operation of the latter for specimen-cutting and operatively connected to said member for moving the latter longitudinally in specimen-advancing direction whereby said first mentioned part is advanced continuously in said direction during the rotation thereof for said cutting operations, means for adjusting the rate of advance of said member in relation to the rate of rotation thereof, and additional means operatively connected to said adjusting means to provide for a relatively high rate of longitudinal movement of said rotary part relative to its rate of rotation.

13. In a microtome, a rotary and axially movable part on which to mount a specimen for cutting sections therefrom, means for rotating and translating said part for successive cutting operations comprising a member which is rotatably and axially movable and operatively connected to said specimen-mounting part for rotating the latter and for translating the same to advance said part for the successive cutting operations, means operatively connected to said member for rotating the latter, said means for rotating said member comprising a part with respect to which said member is longitudinally movable during the rotation thereof whereby to inhibit transmission of longitudinal thrust to said member by said rotating means, and means operable under the control of said rotating means for moving said member longitudinally thereof to thereby translate said first mentioned part for said cutting operations, means for adjusting the rate of advance of said member in relation to the rate of rotation thereof, and means operatively connected to said member for indicating the longitudinal position of the latter.

14. In a microtome, a rotary and axially movable part on which to mount a specimen for cutting sections therefrom, means for rotating and translating said part for successive cutting operations comprising a member which is rotatably and axially movable and operatively connected to said specimen-mounting part for rotating the latter and for translating the same to advance said part for the successive cutting operations, means operatively connected to said member for rotating the latter, said means for rotating said member comprising a part with respect to which said member is longitudinally movable during the rotation thereof whereby to inhibit transmission of longitudinal thrust to said member by said rotating means, means operable under the control of said rotating means for moving said member longitudinally thereof to thereby translate said first mentioned part for said cutting operations, means for adjusting the rate of advance of said member in relation to the rate of rotation thereof, and means for releasably locking said member in a fixed position when the latter is at rest.

15. In a microtome, a rotary and axially movable part on which to mount a specimen for cutting sections therefrom, means for rotating and translating said part for successive cutting operations comprising a member which is rotatably and axially movable and operatively connected to said specimen-mounting part for rotating the latter and for translating the same to advance said part for the successive cutting operations, means operatively connected to said member for rotating the latter, said means for rotating said member comprising a part with respect to which said member is longitudinally movable during the rotation thereof whereby to inhibit transmission of longitudinal thrust to said member by said rotating means, means operable under the control of said rotating means for moving said member longitudinally thereof to thereby translate said first mentioned part for said cutting operations, and means for adjusting the rate of advance of said member in relation to the rate of rotation thereof, said means comprising a pair of spaced plates having laterally offset axes of rotation and means for transmitting motion between said plates, said transmitting means being transversely movable relative to said axes of rotation to adjust the relative speed of rotation of said spaced plates, said plates being interposed in said moving means and operatively connected to said member and rotatable thereby.

16. In a microtome, a rotary and axially movable part on which to mount a specimen for cutting sections therefrom, means for rotating and translating said part for successive cutting operations comprising a member which is rotatably and axially movable and operatively connected to said specimen-mounting part for rotating the latter and for translating the same to advance said part for the successive cutting operations, means for rotating said member, and means for adjusting the rate of advance of said member in relation to the rate of rotation thereof, said last mentioned means comprising a pair of spaced plates having laterally offset axes of rotation and means for operatively connecting said plates, said means being transversely movable relative to said axes of rotation to adjust the relative speed of rotation of said spaced plates, said plates being driven under the control of said rotating means and operatively connected to said member for translating the same.

17. A microtome comprising a cutting implement part and a specimen holder part, one of which parts is rotated and translated in relation to the other part for cutting specimen sections, means for concomitantly rotating and translating said rotary part in relation to said other part for successive cutting operations comprising a rotatable and axially movable first member connected to said rotary part for rotating the latter and for axially moving the same to advance said rotary part towards said other part for the successive cutting operations, a second member operatively connected to said first member for rotating the latter, and means operatively connected to said first member independently of said second member to advance said rotary part for the cutting operations independently of said second member whereby to inhibit transmission of endwise thrust from said second member to said first member, said advancing means being driven by said first member during the rotation thereof.

18. A microtome comprising a cutting implement part and a specimen holder part, one of which parts is rotated and translated in relation to the other part for cutting specimen sections, means for concomitantly rotating and translating said rotary part in relation to said other part for successive cutting operations comprising a rotatable and axially movable first member connected to said rotary part for rotating the latter and for axially moving the same to advance said rotary part towards said other part for the successive cutting operations, a second member operatively connected to said first member for rotating the latter, said first and second members being axially relatively movable and restrained against relative rotation, and means operatively connected to said first member independently of said second member to advance said rotary part for the cutting operations independently of said second member whereby to inhibit transmission of endwise thrust from said second member to said first member.

19. A microtome comprising a cutting implement part and a specimen holder part, one of which parts is rotated and translated in relation to the other part for cutting specimen sections, means for concomitantly rotating and translating said rotary part in relation to said other part for successive cutting operations comprising a rotatable and axially movable first member connected to said rotary part for rotating the latter and for axially moving the same to advance said rotary part towards said other part for the successive cutting operations, a second member operatively connected to said first member for rotating the latter, and means operatively connected to said first member independently of said second member to advance said rotary part for the cutting operations independently of said second member whereby to inhibit transmission of endwise thrust from said second member to said first member, said advancing means being driven by said first member during the rotation thereof, said rotary part comprising a flywheel having a specimen holder mounted thereto eccentric to the axis thereof.

20. A microtome comprising a cutting implement part and a specimen holder part, one of which parts is rotated and translated in relation to the other part for cutting specimen sections, means for concomitantly rotating and translating said rotary part in relation to said other part for successive cutting operations comprising a rotatable and axially movable first member connected to said rotary part for rotating the latter and for axially moving the same to advance said rotary part towards said other part for the successive cutting operations, a second member operatively connected to said first member for rotating the latter, and means operatively connected to said first member independently of said second member to advance said rotary part for the cutting operations independently of said second member whereby to inhibit transmission of endwise thrust from said second member to said first member, said advancing means being driven by said first member during the rotation thereof, and means for resiliently urging said rotary part axially away from said other part whereby to eliminate play in said advancing means during the advance of said rotary part towards said other part.

21. A microtome comprising a cutting implement part and a specimen holder part, one of which parts is rotated and translated in relation to the other part for cutting specimen sections, means for concomitantly rotating and translating said rotary part in relation to said other part for successive cutting operations comprising a rotatable and axially movable first member connected to said rotary part for rotating the latter and for axially moving the same to advance said rotary part towards said other part for the successive cutting operations, a second member operatively connected to said first member for rotating the latter, and means operatively connected to said first member independently of said second member to advance said rotary part for the cutting operations independently of said second member whereby to inhibit transmission of endwise thrust from said second member to said first member, said advancing means being driven by said first member during the rotation thereof, and means for adjusting the rate of axial movement of said rotary part relative to its rate of rotation whereby to adjust the thickness of cut of the specimen sections.

22. A microtome comprising a cutting implement part and a specimen holder part, one of which parts is rotated and translated in relation to the other part for cutting specimen sections, means for concomitantly rotating and translating said rotary part in relation to said other part for successive cutting operations comprising a rotatable and axially movable first member connected to said rotary part for rotating the latter and for axially moving the same to advance said rotary part towards said other part for the successive cutting operations, a second member operatively connected to said first member for rotating the latter, and means operatively connected to said first member independently of said second member to advance said rotary part for the cutting operations independently of said second member whereby to inhibit transmission of endwise thrust from said second member to said first member, said advancing means being driven by said first member during the rotation thereof, and means for adjusting the rate of axial movement of said rotary part relative to its rate of rotation whereby to adjust the thickness of cut of the specimen sections, said adjusting means including a manually operable quick-shift device for obtaining substantially the maximum rate of axial movement of said rotary part relative to its rate of rotation.

23. A microtome comprising a cutting implement part and a specimen holder part, the latter part being rotated and translated in relation to said cutting part for cutting specimen sections, means for rotating and translating said rotary part in relation to said cutting part for successive cutting operations comprising a rotatable and axially movable first member connected to said rotary part for rotating the latter and for axially moving the same to advance said rotary part towards said cutting part for the successive cutting operations, a second member operatively connected to said first member for rotating the latter, and means operatively connected to said first member independently of said second member to advance said rotary part for the cutting operations independently of said second member, said advancing means being operatively interconnected to said first member and being driven thereby during the rotation thereof.

24. A microtome comprising a cutting implement part and a specimen holder part, the latter part being rotated and translated in relation to said cutting part for cutting specimen sections, means for rotating and translating said rotary part in relation to said cutting part for successive cutting operations comprising a rotatable and axially movable first member connected to said rotary part for rotating the latter and for axially moving the same to advance said rotary part towards said cutting part for the successive cutting operations, a second member operatively connected to said first member for rotating the latter, and means operatively connected to said first member independently of said second member to advance said rotary part for the cutting operations independently of said second member, said advancing means being operatively interconnected to said first member and being driven thereby during the rotation thereof, said first and second members comprising a pair of concentric shafts axially relatively movable and restrained against relative rotation, said shafts having interengaging provisions providing for said axial relative movement and restraining said relative rotation.

25. A microtome comprising a cutting implement part and a specimen holder part, the latter part being rotated and translated in relation to said cutting part for cutting specimen sections, means for rotating and translating said rotary part in relation to said cutting part for successive cutting operations comprising a rotatable and axially movable first member connected to said rotary part for rotating the latter and for axially moving the same to advance said rotary part towards said cutting part for the successive cutting operations, a second member operatively connected to said first member for rotating the latter, and means operatively connected to said first member independently of said second member to advance said rotary part for the cutting operations independently of said second member, said advancing means being operatively interconnected to said first member and being driven thereby during the rotation thereof, said first and second members comprising a pair of concentric shafts axially relatively movable and restrained against relative rotation, said shafts having interengaging provisions providing for said axial relative movement and restraining said relative rotation, said advancing means including means for adjusting the rate of axial movement of said first member shaft relative to its rate of rotation comprising a pair of spaced plates having laterally offset axes of rotation and means interposed between said plates for transmitting motion thereby, said interposed means being transversely movable relative to said axes of rotation to adjust the relative speed of rotation of said spaced plates, and manually operable means for transversely moving said interposed means whereby to adjust the rate of axial movement of said first shaft and said rotary part relative to the rate of rotation thereof.

26. A microtome comprising a cutting implement part and a specimen holder part, the latter part being rotated and translated in relation to said cutting part for cutting specimen sections, means for rotating and translating said rotary part in relation to said cutting part for successive cutting operations comprising a rotatable and axially movable first member connected to said rotary part for rotating the latter and for axially moving the same to advance said rotary part towards said cutting part for the successive cutting operations, a second member operatively connected to said first member for rotating the latter, and means operatively connected to said first member independently of said second member to advance said rotary part for the cutting operations independently of said second member, said advancing means being operatively interconnected to said first member and being driven thereby during the rotation thereof, said first and second members comprising a pair of concentric shafts axially relatively movable and restrained against relative rotation, said shafts having interengaging provisions providing for said axial relative movement and restraining said relative rotation, said advancing means including means for adjusting the rate of axial movement of said first member shaft relative to its rate of rotation comprising a pair of spaced plates having laterally offset axes of rotation and means interposed between said plates for transmitting motion therebetween, said interposed means comprising a retainer member carrying a pair of ball elements in mutual surface-to-surface contact, and in surface contact with the confronting faces of said plates, a screw device for transversely moving said retainer member relative to said axes of rotation whereby to transversely move said ball elements relative to said axes of rotation, and a manually operable quick-shift device for moving said retainer member to a position for obtaining substantially the maximum rate of axial movement of said rotary part relative to its rate of rotation.

References Cited in the file of this patent

UNITED STATES PATENTS

| | | |
|---|---|---|
| 1,414,953 | Ingram | May 2, 1922 |
| 2,105,762 | Zimmerman | Jan. 18, 1938 |
| 2,113,932 | Crooks | Apr. 12, 1938 |
| 2,163,443 | Abrams | June 20, 1939 |
| 2,439,671 | Ott | Apr. 13, 1948 |
| 2,461,621 | Allen | Feb. 15, 1949 |
| 2,482,853 | Ladd | Sept. 27, 1949 |
| 2,537,967 | Carlin | Jan. 16, 1951 |

FOREIGN PATENTS

| | | |
|---|---|---|
| 400,691 | Great Britain | Nov. 2, 1933 |
| 748,775 | Germany | Nov. 9, 1944 |
| 645,123 | Great Britain | Jan. 6, 1951 |